United States Patent
Kodde

(10) Patent No.: US 10,672,014 B2
(45) Date of Patent: *Jun. 2, 2020

(54) METHOD AND A DEVICE FOR DECODING DATA STREAMS IN RECONFIGURABLE PLATFORMS

(71) Applicant: ENYX SA, Paris (FR)

(72) Inventor: Edward Kodde, Atlanta, GA (US)

(73) Assignee: ENYX SA, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/281,482

(22) Filed: Feb. 21, 2019

(65) Prior Publication Data
US 2019/0188738 A1 Jun. 20, 2019

Related U.S. Application Data

(63) Continuation of application No. 14/502,243, filed on Sep. 30, 2014, now Pat. No. 10,229,426.

(30) Foreign Application Priority Data

Oct. 1, 2013 (EP) ..................................... 13306357

(51) Int. Cl.
| | |
|---|---|
| *G06Q 10/06* | (2012.01) |
| *G06Q 30/02* | (2012.01) |
| *G06F 7/76* | (2006.01) |
| *G06Q 40/04* | (2012.01) |
| *H04L 29/06* | (2006.01) |

(52) U.S. Cl.
CPC .......... *G06Q 30/0201* (2013.01); *G06F 7/76* (2013.01); *G06Q 40/04* (2013.01); *H04L 69/12* (2013.01); *H04L 69/16* (2013.01)

(58) Field of Classification Search
CPC .......... G06Q 10/06; G06Q 30/02; G06F 7/76
USPC ........................................................ 705/7.29
See application file for complete search history.

(56) References Cited

U.S. PATENT DOCUMENTS

| | | | | |
|---|---|---|---|---|
| 5,572,206 A | * | 11/1996 | Miller ................. | G06F 9/30178 341/51 |
| 6,269,189 B1 | * | 7/2001 | Chanod ............. | G06F 16/90344 382/229 |
| 7,512,728 B2 | * | 3/2009 | Tseng ...................... | G06F 13/22 709/236 |
| 10,229,426 B2 | * | 3/2019 | Kodde ....................... | G06F 7/76 |
| 2010/0211520 A1 | * | 8/2010 | Oddie .................... | G06Q 10/06 705/36 R |

* cited by examiner

*Primary Examiner* — Nga B Nguyen
(74) *Attorney, Agent, or Firm* — Baker & Hostetler LLP

(57) ABSTRACT

A decoding device is implemented on an integrated circuit, for decoding a market data input stream received in a given data representation format. The decoding device comprises an engine built around a finite state machine, the engine being generated from at least one description file and configured to perform the following steps, in a current state of the finite state machine: i) dividing the market data input stream into a number of tokens and reading a set of tokens, ii) accumulating the set of read tokens in internal registers, iii) generating output commands from the tokens accumulated in the internal registers depending on a condition related to the tokens accumulated in the internal registers, and iv) selecting the next state of the Finite State Machine state based on a triggering condition.

15 Claims, 5 Drawing Sheets

METHOD AND A DEVICE FOR DECODING DATA STREAMS IN RECONFIGURABLE PLATFORMS

CROSS-REFERENCE TO RELATED APPLICATION

This application claims priority to foreign European patent application No. EP 13306357.8, filed on Oct. 1, 2013, the disclosure of which is incorporated by reference in its entirety.

FIELD OF INVENTION

The invention generally relates to data processing systems for processing market data, and more particularly to a method and a device for decoding data streams in reconfigurable platforms.

BACKGROUND

As there is a growing need for faster processing of large volumes of data in financial industries, data processing systems based on clusters relying on general-purpose CPUs show a number of limitations. Indeed, if cluster approaches involve inexpensive hardware and provide tools that simplify the development, they have a number of constraints which are all the more significant as the requirement for high performance computing increases: high electricity consumption, costly maintenance, important space required for data centers. Further, the overall performance obtained with a cluster does not increase proportionally with the number of clusters. Unlike the cluster approach, data processing systems based on FPGAs allows execution of complex tasks in parallel with an important throughput, with a limited number of machines equipped with FPGAs. Accordingly, this hardware approach appears particularly suitable for the development of applications in the field of financial and investment industries where fast calculation is key to remain competitive.

An FPGA (acronym for Field-programmable gate array) designates an integrated circuit which can be configured after manufacturing. The configuration is generally specified using a "Hardware description language" (HDL). FPGAs contain a huge number of programmable logic components ("logic blocks"), and a hierarchy of reconfigurable interconnections that allow the blocks to be "wired together". Logic blocks can be configured to perform complex combinational logic or merely simple basic logical operations (boolean AND, OR, NAND, XOR etc.). As FPGA can perform parallel calculations, a same algorithm can be executed simultaneously for a number of independent inputs in only a few clock cycles. FPGAs are thus particularly suited for executing complex computation very fast.

For these reasons, more and more market data processing systems are designed using FPGAs.

Existing market data processing systems receive data from external sources (such as Exchanges), publish financial data of interest to their subscribers (such as traders at workstations), and route trade data to various exchanges or other venues.

They generally comprise at least one decoder that interacts with the feed sources for handling real time data streams in a given format (FAST, FIX, binary), and decodes them, converting the data streams from source-specific formats into an internal format (data normalization process). According to the message structure in each data feed, the decoder processes each field value with a specified operation, fills in the missing data with value and state of its cached records, and maps it to the format used by the system.

Currently, the decoding of input data streams is performed in software or in hardware, in a purely sequential way, without any parallelization. Existing decoders which perform the decoding in software often undergo bandwidth limitation as the processor of the decoder cannot decode the packets fast enough. This stems from the fact that the software decoder needs to decode every message to determine if it concerns an instrument that is of interest to the application(s). Furthermore, when doing the rest of the processing in hardware, two transfers, from the hardware to the software and the other way around are required. These transfers are very time consuming compared to the typical processing time, and add a lot of latency.

Market data rates have dramatically increased over the past few years, approaching a peak of 1 million messages per second. As market data rates continue to increase, high speed, ultra low latency, and reliable market data processing systems are becoming increasingly critical to the success of the financial institutions. In particular, there is currently a need to provide high-performance decoders capable of processing up to 10 Gb/s market data feeds to feed the order management core with normalized commands that do not depend on the market being processed, while still having the lowest latency possible.

Further, the market data formats evolve quite often, especially those in FAST. This does not raise any major issue for classic software decoders, which can usually be modified easily. In the case of FAST formats, the exchange provides the updated templates file, and the software either loads this file dynamically, or its code (or a part of it) is regenerated automatically from these templates.

However, with decoders using reconfigurable platforms (FPGA), it is difficult to adapt to such format changes in an efficient way. Indeed, while a general-purpose CPU can be easily updated to execute any task, once an FPGA is programmed for a particular task, it is quite complicated to update the FPGA so that it can to execute another task. This would require reprogramming the FPGA again, which is both expensive and complex.

SUMMARY OF THE INVENTION

In order to address these and other problems, there is provided a device for decoding an input market data stream as defined in the appended independent claim 1, and a method for decoding an input market data stream as defined in appended claim 15. Preferred embodiments are defined in the dependent claims.

The invention thus provides high-performance decoders capable of processing up to 10 GB/s market data feeds to feed the order management core with normalized commands that do not depend on the market being processed, while still having the lowest latency possible, and the ease of use and update of software decoders.

The decoder according to the embodiments of the invention can be transparently adapted to evolutions of data formats. Such adaptation can be easily performed by updating the description file which is written in a format such as XML (eXtensible Markup Language), recompiling the description file and providing a new version of the firmware to be downloaded in the reconfigurable platform.

Further advantages of the present invention will become clear to the skilled person upon examination of the drawings and detailed description. It is intended that any additional advantages be incorporated herein.

BRIEF DESCRIPTION OF THE DRAWINGS

Embodiments of the present invention will now be described by way of example with reference to the accompanying drawings in which like references denote similar elements, and in which.

DETAILED DESCRIPTION

Figure 1:
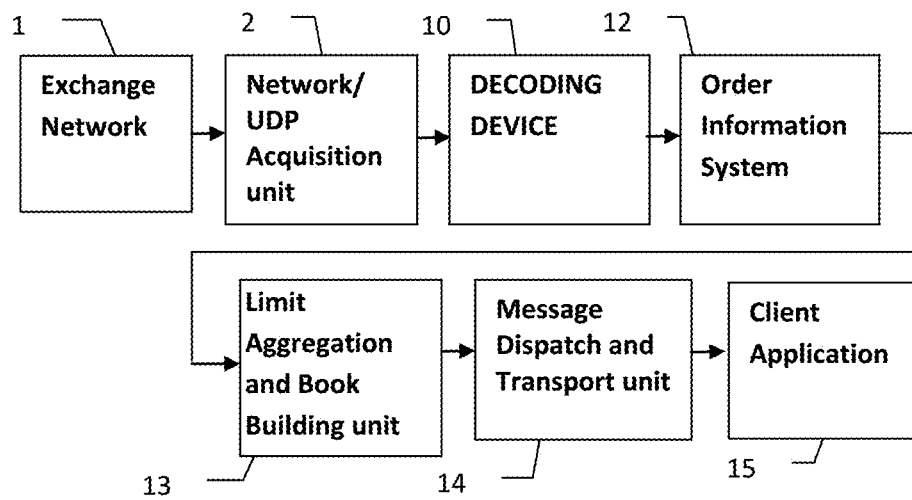
FIG. 1 represents an exemplary data processing architecture including a decoding device according to the embodiments of the invention.

Referring to FIG. 1, there is shown an exemplary data processing system 100 provided to acquire and process market data.

As used herein, the term "market data" refers to data received in the form of a data stream from a number of external sources that comprise quote and trade-related data associated with equity, fixed-income, financial derivatives, currency, etc.

The data processing system 100 comprises at least one market data packets decoder 10 (also referred to as a "decoder" or "decoding device") that interacts with feed sources for processing market data feeds received according to any source-specific protocol from exchange networks 1, for decoding them.

More specifically, the decoding device 10 is configured to receive input messages such as UDP payloads (acronym for User Datagram Protocol) or TCP payloads (acronym for Transmission Control Protocol), decode them into messages, and output normalized commands 8 based on the decoded message.

The output commands 8 provided by the decoding device 10 may be fed to an order management system 12. The order management system 12 comprises at least one memory for storing details related to each order to retrieve them when needed.

The system 100 may further include a Limits Aggregation and Book Building unit 13 to aggregate the orders that are pending into order books, present for each instrument a list of orders, possibly aggregated into limits and sorted by price. Generally, client applications 15 essentially need to access the first limits of a book. Alternatively, the client applications may access the orders directly.

As used herein, the terms "order" or "limit order" or "market order" refer to an order to buy or sell a given quantity of a financial instrument at a specified limit price or better, or at the market price for market orders.

Further, an order book refers to the electronic collection of the outstanding limit orders for a financial instrument, such as for example a stock. As used herein, the term "limit" refers to a "line" or "entry" in an order book that corresponds to one or several orders. When it corresponds to several orders, it may also be referred to as an "aggregated limit". Limits are aggregated by price, i.e. all orders with a same price have their quantities added up to form the limits quantity. An aggregated limit may also have an "order count" property reflecting the number of orders that have been aggregated in this limit. The position of a limit inside a book is referred to as a "line number" or a "level".

As shown, the data processing system 100 may also comprise a Message Dispatch and Transport unit 14 for formatting the processed data in messages and dispatching them to selected client applications 15 for further processing and decision taking. The client applications 15 may be located on different servers so that message transport may be done over a network.

In many fields of data processing, there is a need to improve data processing speed. However, modern data processing systems are faced with a growing amount of data. The first step of a data processing chain comprises of the data acquisition phase which in network applications consists of Network (generally UDP or TCP) acquisition 2, and is generally performed by the NIC (Network Interface Card) and the Operating System's Network Stack, and of the data packet decoding phase.

The data packets decoding phase performed by the decoding device 10 depends on the format of the incoming data, which itself depends on the specific application. For example, in data processing systems for processing market data exchanged by financial institutions, the Data Packets decoding phase depends on the market since each market has its own data format.

Generally, three types of formats are used for market data feeds:
 binary formats,
 FIX-based formats, and
 FAST-based formats.

In binary formats, generally used in equity markets, all the fields are sent in binary, and message structures are fixed. This allows the decoding device 10 to use these structures to parse the messages. Messages are generally encapsulated in packets, with a binary header indicating the number of messages included in the packet. Messages generally start with a field indicating their sizes so that the decoding device can skip the messages it does not handle based on the size information, and possibly do some integrity checking.

In some market application, ASCII strings, or more rarely UNICODE strings, may also be put in some fields. However, when those strings have a fixed length, with padding at the end of the string if necessary, they can be treated as a regular binary field.

FIX stands for Financial Information eXchange. In this kind of formats, fields are coded in ASCII, each preceded by their field ID and separated by SOH (Start Of Header) characters. The example below represents a Fix encoded message, where SOH characters are represented by the sign "|":

"8=FIX.4.2|9=178|5=8|49=PHLX|56=PERS|52=200711 23-05:30:00.000| 11=ATOMNOCCC9990900|20=3|150=E|139=E|55=MSF T|167=CS|54=1|38=15|40=2|44=15|58=PHLX EQUITY TESTING|59=0|47=C|32=0|31=0|151=15|14=0|6=0|10= 128|"

For example, the first part of the above message, "8=FIX.4.2", defines the value of field 8, which is the version of the FIX protocol used, and the part "35=8" defines the value of field 35 representing the message type.

In FIX, fields do not have fixed sizes and can appear in almost any order, except for some fields which have a mandatory order like the fields in header of the message, or the fields in repeating data groups.

A FIX-based format is available for most exchanges, usually as a legacy format that supplements their proprietary one.

FAST stands for FIX Adapted for STreaming. It is a compressed variant of the FIX protocol designed to use less bandwidth by removing redundant information. Fields are coded in binary, but with "stop bits": each byte contains 7 bits of payload and one bit, called the "stop bit", to signal the end of a field. Like FIX, FAST's fields have thus variable sizes.

Further, in FAST, fields are always in the same order but operators are applied to them and in some cases they can be completely removed from the input stream.

In future and derivative market applications, where feeds are encoded in FAST, the templates file(s) may be provided by the exchange. These templates describe the structures of the messages and the operators to apply to each field. For example, a field with a "delta" operator that remains constant can be completely removed from the stream. If this same field is incremented by 1, the value transmitted in the stream is 1, which is coded on 1 byte using the stop bits, instead of sending the whole value of the field, which can require several bytes. Some fields represent "presence maps" and are used to code the presence of other fields. Thus, when bits in this field are set to 0, this indicates that the corresponding optional fields are absent. Generally, no redundant information is transmitted, and all the information can still be recovered by the decoding device.

The FAST protocol is mainly used by future and derivative exchanges.

Conventional FIX, FAST and even binary decoders generally decode an input stream according to a serial processing. Every field is generally read sequentially. Operators may be applied if required, and decisions about the next steps of the decoding may be taken after each field.

In FIX protocol, the fields in a message can be in any order, and the end of the message is detected by the beginning of the next one. Similarly, for repeating data groups, the end of one group is detected by the beginning of another group. The number of fields to be read can thus not be known in advance, and fields must be read one after the other.

In FAST protocol, each byte is appended to a current field buffer until a stop bit is found. The suitable operator is then applied to this field. However, if a field is absent (i.e. the corresponding presence map bit is set to 0), no data can be read and this field must be skipped. The same applies to some operators such as for example:

the "delta" operator: when the old and new values are the same, the delta operator can set a presence map bit to 0 and put nothing in the stream, data types: "optional decimals" can have only 1 field used; the exponent is then in the stream and null, and no mantissa is present; the number of fields to be read cannot be known in advance.

For binary protocols, the size of each message is known in advance. However, there are still some constructs, such as the selection of the suitable message type, that are sequential.

Currently, the decoding of messages in binary or based on the FIX or FAST protocols is performed in software or in hardware, in a purely sequential way, without any parallelization.

Most existing decoding devices are handwritten to be optimized for a specific market and are thus different for each market. Some existing software decoding devices are compiled from description files but main known software decoders for FAST protocol are generic decoders which use templates, possibly precompiled. However, these approaches do not allow reaching the same data rates even in situations where the templates are pre-compiled into some kind of binary code.

The decoding device 10 according to the various embodiments of the invention relies on a code generation approach that provides specially generated and optimized code that allows reaching higher data rates than the ones obtained with conventional generic decoders. Such code generation according to the embodiments of the invention is unusual in the field of hardware decoders.

Figure 2:
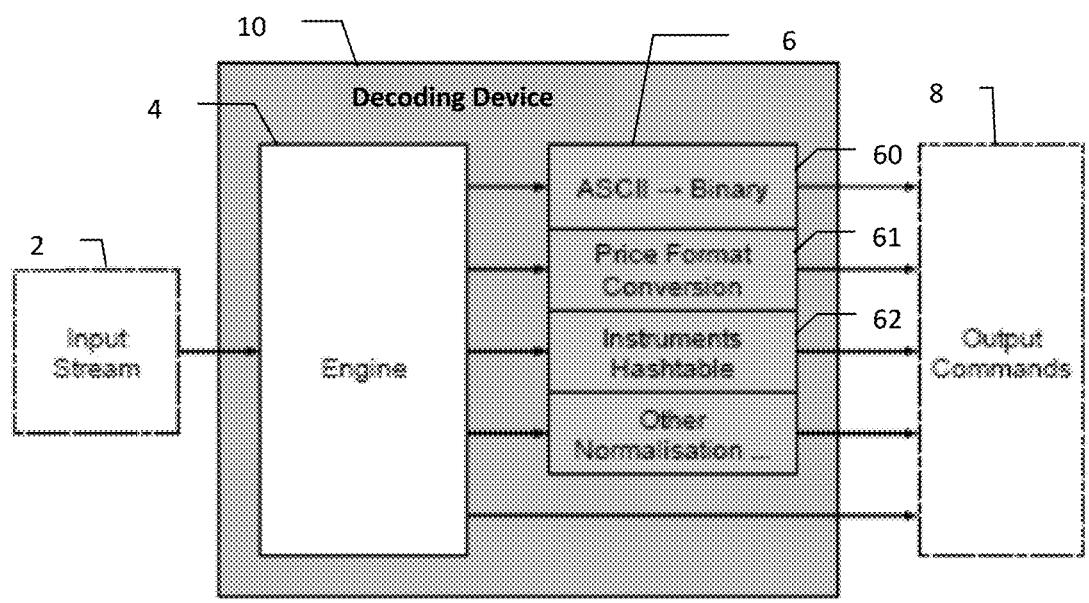
FIG. 2 shows a decoder architecture, according to certain embodiments of the invention.

Reference is now made to FIG. 2 showing the internal structure of the decoding device 10 (also referred to as a decoder) according to certain embodiments of the invention.

The decoding device 10 is configured to receive an input stream 2 and generate output commands 8 on its output bus. The input stream 2 is received in a given data format (which can be FIX-based, FAST-based, binary) and is provided by a market (for example the NASDAQ market provides a binary data stream). In particular, the input stream 2 may be provided in any data representation format that extends the FAST templates specification.

The decoding device 10 comprises an engine 4 generated by a compiler based on at least one description file 5. The description files 5 describe the commands that are to be generated by the engine 4. The engine 4 provides most of the code of the decoding device, which is adapted to process the input stream 2 and provides normalized output commands 8.

Thus, the decoder is further configured to convert a variety of messages from the market into output commands 8. The messages may include for example for by-order markets (for example, NASDAQ, BATS):

An add message for requesting addition of an order to an order book;

A cancel or delete message for requesting deletion (total or partial) of an order from an order book, An execute message, requesting execution (total or partial) of an order from an order book, A replace or modify message for requesting modification of one or more properties of a limit order comprised in an order book (for example, modification of the quantity or price).

The messages may further comprise for "by-limit" markets (for example, CME, EUREX):

A limit creation message, to create a limit, indexed by its level, and shift all the limits under it down, A limit deletion message for deleting a limit in the book, indexed by its level, and shifting all the limits under it up, and A limit modification message, to modify a limit, indexed by its level.

The messages may also comprise for "by-price" markets (for example, LIFFE, TSE): a price update message for updating a limit indexed by its price; such message creates the limit if it does not already exist, and deletes it if its quantity reaches 0.

These messages are transformed into commands by the decoding device 10. Output commands 8 are carried on a bus that may comprise several signals, such as:

- An operation code or opcode used to identify the command type (such as add, delete, replace, etc. for «by-order» streams, or create limit, delete limit, etc. for "by limit" streams);
- An instrument identifier for identifying the instrument to which the command is related;
- An order identifier for identifying the order to which the command is related;
- A price and quantity information representing the price and quantity parameters of the command;
- Additional data signals depending on the command.

Some of the above signals may not be used. For example, the order identifier may only be used for commands related to an order and the instrument identifier may only be used for the commands related to a particular instrument and when the instrument is known: the DELETE commands for deleting a particular order for example relate to an order on a given instrument. This instrument is generally not transmitted by the market, and thus not present on the output commands bus 8. The Order Management System 12 is then responsible for finding the instrument ID using the order ID.

The decoding device 10 may further comprise a set of conversion units 6. The conversion units 6 are configured to further normalize the commands output by the engine 4 that are already as close as possible to the desired normalized output commands 8. Indeed, some operations may be hard to describe efficiently in the description files 5, or need specially optimized code that cannot be automatically generated. The conversion units 6 may comprise the following units for example:

ASCII to Binary converters 60: some fields in binary streams are coded in Ascii, as are all the fields in FIX streams. When such fields correspond to quantities for example, it may be interesting to convert them to a binary format because that allows arithmetic operations to be applied to them. This may apply for example when the bus on which the output commands 8 are sent requires that some fields must be sent as integers, which is the case for example for quantities.

Price format converters 61: market data streams can contain prices in various formats, depending on the market, such as floating point, fixed point with various coefficients (×100, ×10000 . . . ), "ticks" associated with a "tick size" (in that case the actual price is obtained by multiplying the number of ticks by the tick size). In order to be able to handle several markets and compare their prices easily, they may be normalized to fixed point values with a $10^{\wedge}8$ coefficient. This allows coding all the prices from all known markets without losing any information.

Hashtables 62 for transforming strings into integers: Integers are generally easier to handle. As a result, the output bus may preferably use instrument and group IDs (Identifiers) instead of names as done in some markets. To transform the names into IDs, hashtables 62 can be used that contain the relation between the names and the IDs. Even when the market sends IDs, a hashtable may be still added to transform the market's IDs into internal IDs.

Figure 3:
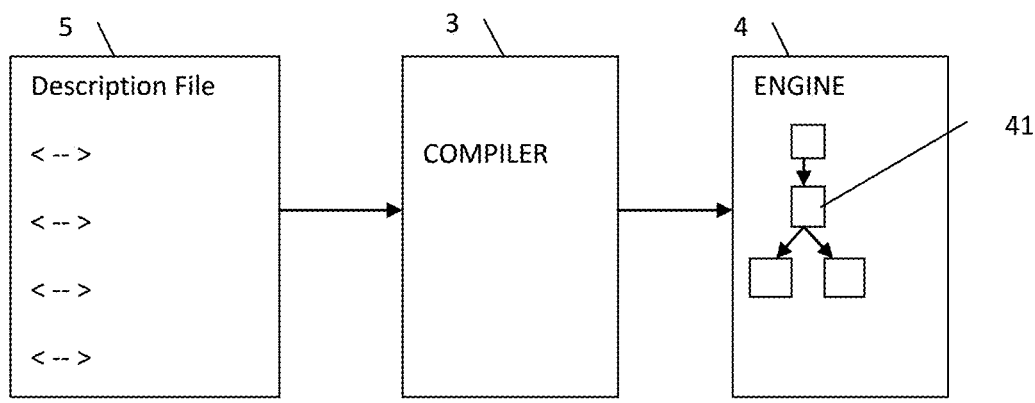
FIG. 3 is a diagram block illustrating the generation of the decoder engine, in accordance with the embodiments of the invention.

As shown in FIG. 3, the compiler 3 is configured to process the description file 5 and generates an engine 4 comprising a Finite State Machine 41 (also referred to as "FSM"), in a hardware description language such as Verilog or VHDL. The following description will be made with reference to a description file 5 comprising at least one XML description file and an engine 4 written in a hardware description language such as VHDL and comprising a Finite State Machine 41.

The description file 5 may be for example in the XML (acronym for Extensible Markup Language) format. The syntax of the description files 5 used according to the embodiments of the invention to generate the decoding device is similar to the syntax of conventional FAST description files. More specifically, the description file 5 may comprise a description of the commands generated by the engine and of the format of the input stream.

If the input stream is derived from the FAST format, the description file 5 may incorporate the content of the templates obtained from the exchange. Such templates may be in XML format. The content of the templates received from the market can then be referenced in the description file 5, for example by use of a specific tag <xi:include>, and the templates file can then be supplemented to describe decoder device output commands. This tag is used to incorporate the market description file content (template description file content) in the tag location. The original template description file is kept as is so that it can be compared to future versions that may be created in the context of evolutions of the stream format.

When the input stream is in a binary format, the description file is not based on templates provided by the exchange. It may be written from the specifications published by the exchange. The description file then includes the description of the input market data feed and the description of the output commands to generate.

The structure of the XML description file 5 accordingly depends on the specific market application.

For example, for a EUREX stream using the FAST format, a corresponding templates file is provided by the EUREX market. It describes the format of the stream, the "template" used for each message, and the operators used for each field. The content of the templates file will then be included in the description file 5 by using a «xi:include» XML tag.

In another example where the input stream is a NASDAQ stream, in a binary format, there is no template provided by NASDAQ to describe its streams, in XML or in any other computer-readable format. Thus, the description and the commands of the NASDAQ stream are entirely written in a same XML file 5, so that they can be more readable.

The description file 5 written according to the invention adds two features sets to the existing FAST template format:

the first set is configured to describe feeds that are not FAST encoded and that might have features not supported by FAST; For feeds in FIX format, the compiler is made compatible with XML descriptions of the FIX specifications (as generated by the QuickFix project);

the second set is configured to describe the output commands of the decoding device; in particular, when the engine 4 cannot output directly fully normalized commands, the description file 5 is adapted to describe commands that are as close as possible to the normalized ones.

The description files 5 thus written make it possible to decode the input stream, in any data representation format that extends the FAST format. By supplementing the input description files provided by the market with an additional tag section, it is possible to support additional formats and evolutions of the conventional FAST formats.

The XML description files 5 have a higher level of abstraction than the VHDL file 41 generated from them, and contain less code, making modifications easier and bugs less likely.

According to one aspect of the invention, each engine 4 instantiates at least one tokenizer 40 which is configured to break the input stream into meaningful elements referred to as tokens, depending on the input stream format.

To dynamically generate the engine 4, the invention provides a common code structure, based on the tokenizer 40 and the Finite State Machine 41, which can be adapted to all formats.

Figure 4:
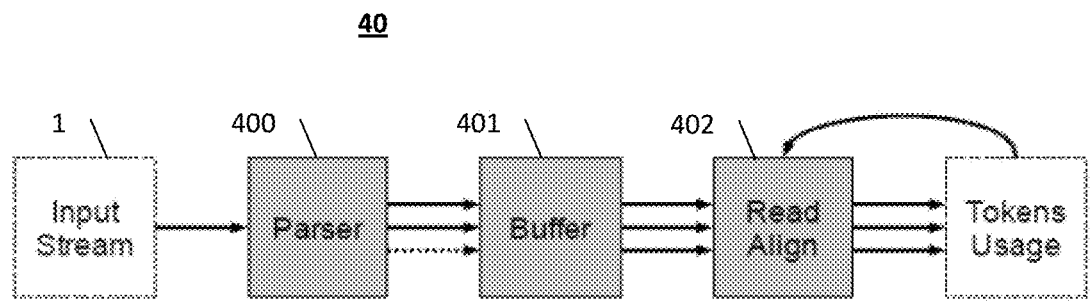
FIG. 4 shows the tokenizer architecture, according to certain embodiments of the invention.

FIG. 4 illustrates the architecture of a tokenizer 40 according to certain embodiments of the invention.

The tokenizer 40 is configured to receive the input stream, process it and output tokens separated from each other that can be used by the Finite State Machine 41. According to one aspect of the invention, the tokens may comprise bytes depending on the format of the market data input stream: for example, in binary format, each token corresponds to individual bytes; in Fix format, each token corresponds to FIX fields which comprise bytes, and in Fast format, each token corresponds to FAST fields which comprise bytes.

The tokenizers 40 may comprise:

For FAST streams, a tokenizer of a first type for outputting FAST fields which cuts the input stream at each stop bit.

For FIX streams, a tokenizer of a second type for outputting FIX fields and the field IDs as separate tokens, so as to be able to read the next field ID at the same time as the current field value. The tokenizer of a second type is arranged to cut the stream at both the SOH character (I) and the =character.

For binary streams, a tokenizer of a third type for outputting individual bytes.

A tokenizer 40 according to the embodiments of the invention have not only deserializer functions for outputting single tokens but can also output the number of tokens required by the rest of the engine logic, with a maximum set at compilation. This allows several tokens to be read per clock cycle. The tokenizer 40 is configured to output an array of tokens (3 tokens in the example of FIG. 4) which can be used by the Finite State Machine 41. In return, the Finite State Machine 41 is configured to send the number of tokens it used. During the next clock cycle, the tokenizer 40 will then read and present at its output interface the unused tokens and new tokens obtained from the input stream.

As shown in FIG. 4, a tokenizer 40 may comprise a parser 400 which forms the core of the tokenizer. The parser 400 is provided to actually cut (or divide) the stream into a set of tokens.

Additionally, the tokenizer 40 may be configured to take the input stream bandwidth without back-pressuring effect. A back-pressuring effect generally occurs when a core lowers its "ready" signal to make the core connected to its input wait. The side effect is that it lowers the maximum bandwidth a core supports, because it wastes clock cycles waiting. In this respect, the parser 400 may be accordingly configured to output the maximum number of tokens that can be provided in one word of data from the input stream 2. Some tokens at the output of the parser 400 may not be used. If a token spans across multiple bytes, the maximum amount of tokens may not be used and some tokens can thus be marked as invalid. For example, in the case of a FAST parser, if the bus at the input of the parser 400 has a width of 8 bytes, the maximum amount of tokens, as defined at compilation time, will be 8 since a token is at least one byte. However, some tokens can be several bytes long. For example, if 2 tokens are two bytes long and 1 token is four bytes long, only 3 valid tokens may be presented at the output of the parser, and the other five tokens may be marked as invalid. According to another example, if a token is encountered that is 20 bytes long, it may span across 3 words of input data and there may be no valid token output for at least 2 clock cycles.

The tokenizer 40 may further comprise a buffer 401 for buffering the tokens so that the tokens in the array of tokens at its output are valid at each transfer. The tokens of the array are then marked as valid, unlike what occurs at the output of the parser 400 where some tokens of the array may not be used. This eases the processing performed by a read management core 402 (also referred to thereinafter as "read align core"), provided downstream the buffer 401, and makes higher operating frequencies possible.

The read align core 402 of the tokenizer 40 is provided to allow partial reads. The FSM 41 may read all the available tokens presented on the output interface of the "read align" core 402. Alternatively, it may be configured to read only some of the available tokens. In such embodiment, the set of tokens read among the available tokens may depend on a condition, and in particular a condition setting the number of tokens that are to be read. For example, the number of tokens that are to be read may depend on the value of a specific token. The operation of the read align core 402 has particular advantages when the Finite State Machine 41 is not ready. For example, if the number of tokens that are to be read depends on the value of a specific token that is being read, the specific token is read, and then, depending on its value, more or less tokens will be read during the next cycle(s). The number of tokens to be read may also depend on some parameters related to the structure of the finite state machine 41.

The amount of tokens read is sent back to the "read align" core 402 so the remaining tokens which have not been read may be appended to new tokens and presented again on its output interface during the next clock cycle(s).

For binary streams, the tokenizer 40 may not comprise a parser 400. Further, a special version of the read align core 402 can be used to allow for random byte length reads in the stream, each word of the input stream already containing the maximum number of tokens since the tokens are actually the individual bytes in the stream. Indeed, in the case of a binary stream, the tokens correspond to bytes so that a parser is not required to separate the stream into bytes and then assembling the obtained bytes in a buffer.

For FIX streams, the parser 400 can create up to half the number of input bytes as for each token a delimiter-character is consumed (either a "I" or a "=").

For FAST streams, the parser 400 can create as many FAST tokens as there are input bytes, since each of them can contain a stop bit.

Tokens thus obtained may comprise, along the original extracted field, information about the field like its length, and its value converted in various formats (for example, the binary representation of the ASCII string for FIX, or the right-padded version of the field for FAST).

In accordance with the embodiments of the invention, the operation of the tokenizers 40 is controlled by the finite state machine 41.

In particular, the finite state machine 41 is configured to perform at least some of the following actions:

reading a selected amount of tokens/fields from the tokenizer 40, copying the read fields to storage elements, applying selected operators for FAST streams, and/or initiate the output commands at a determined moment.

The finite state machine 41, dynamically generated from the XML description file 5, forms the heart of the engine 4. The structure of the state machine 41 corresponds to the structure of the decoded feed, with branches at each message or part of message selection, and loops for repeating elements inside messages.

The finite state machine 41 allows reading as many tokens as possible in each state. However, the presence of some fields and thus the number of tokens to read may depend on the value or the presence of the field before it.

The state machine 41 may be also configured to handle any error that could happen while decoding the packet, such as a malformed message, an unexpected end of packet, or an unknown message.

Each state machine 41 depends on the market data input stream as it is generated from the XML description files, and can be updated at each input stream format update. Each state machine 41 may have a huge number of states. For example, in options and equity market applications, where the FAST message templates provided by the exchanges can be quite big, the finite state machine 41 can include more than 600 states.

According to another aspect of the invention, the engine 4 may include a set of storage elements 7 for storing data read in the input stream and later outputting commands containing the data, according to the information comprised in the description file 5. In particular, the storage elements 7 may comprise internal registers. The following description will be made with reference to storage elements 7 implemented as internal registers, for illustrative purpose only.

The information comprised in the input stream 2 depends on the market. For binary markets, the input stream is generally provided with only key information so that most fields from the input stream are stored and sent in the output commands. In FAST or FIX markets, the input streams generally comprise a lot of information. Only key information (i.e. determined as being of interest for the target clients) may be stored and sent in the output commands.

A separate and clocked process is provided to take the signals from the state machine 41 that initiate the output commands. The process then carries out these commands by selecting internal registers and copies them to output command ports. In particular, the Finite State Machine 41 can generate a signal called «command sending» and a further signal called «command number». The registers copied in the command can be selected depending on the command number. The description of the commands that are to be sent is provided in the description file. Using a separate, clocked process adds a register stage between the state machine 41 and the output bus, after the multiplexers that select the registers to copy to the output bus, which eases timings closure.

The decoding device 10 according to the invention may further include statistic counters generated by the engine compiler (also referred to as statistical registers). The statistic counters can be updated based on the signals provided by the state machine 41. The statistics counters may be incremented or set based on the signals taken from the state machine 41. They can be read from a standard interface such as an Avalon MM interface. The information maintained in the statistic counters can be used for debugging and detecting misconfigurations. Some registers are added automatically by the compiler (counters of decoding errors, of unexpected ends of packets). The other registers can be described in the description files 5. Counters can be added for each message type in order to be able to monitor the message counts for different message types. They can be used in particular to check if test vectors contain a sufficient amount of messages of each type.

Figure 5:
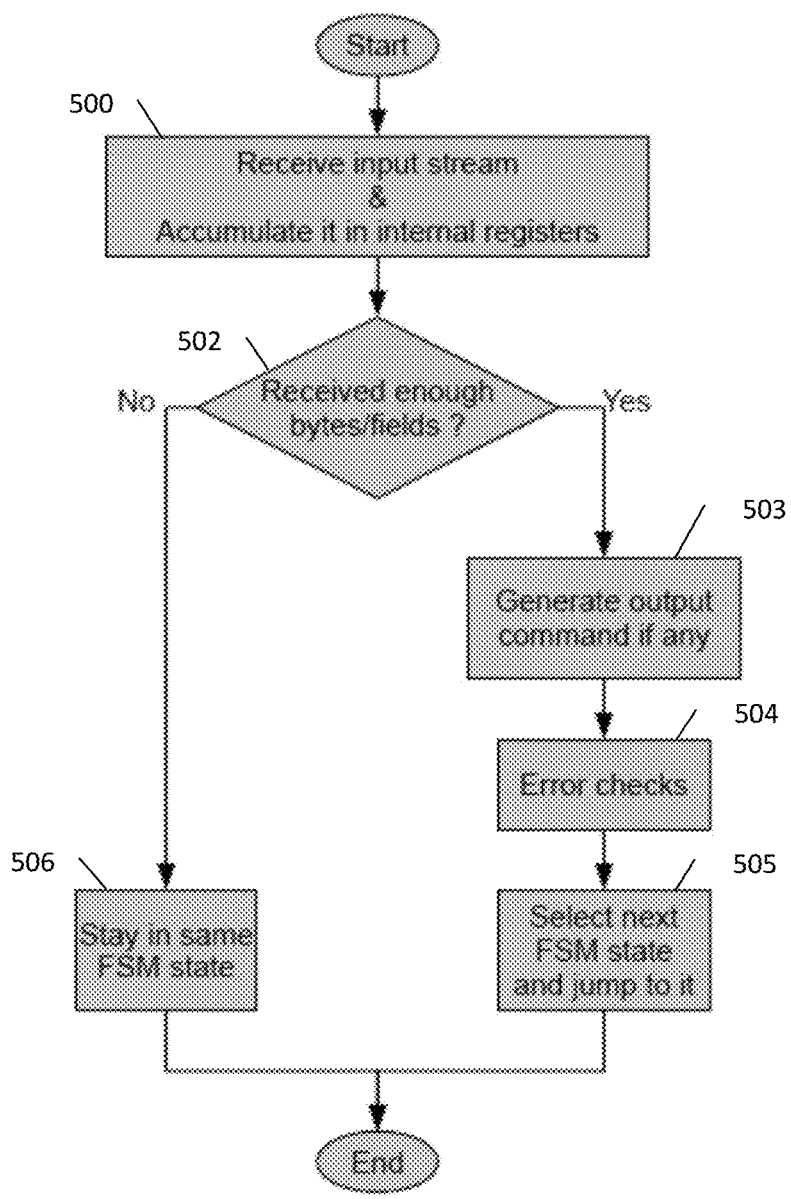
FIG. 5 is a flowchart of the steps performed for decoding an input streams, according to certain embodiments of the invention.

FIG. 5 is a flowchart illustrating the decoding method according to certain embodiments of the invention.

At step 500, in the current state of the finite state machine, the input stream 2 in a given format is received, separated into tokens, and accumulated in the internal registers. The tokens may comprise FAST fields if the input stream is encoded in FAST format or in a format derived from FAST, FIX fields if it is encoded in FIX, or alternatively bytes (binary format).

In step 502, it is determined if enough tokens have been received. In this step, the number of tokens (bytes in the case of a binary input stream or FIX fields in case of a FIX-based input stream or FAST fields in the case of a FAST-based input stream) received in the previous step is compared to a threshold number corresponding to the number of tokens (bytes/fields) that are expected to be received in the current state of the Finite Machine State 41. The threshold number may be fixed by the compiler at compilation time, depending on the content of the description file 5.

If the number of tokens is sufficient, the engine then proceeds with the other steps 503 to 505. Otherwise, the process remains in the same FSM state (506) and waits for the next clock cycle. At the next clock cycle, steps 500 and 502 will be reiterated to determine if more tokens can be read.

At step 503, output commands are generated.

Some states of the finite state machine 41 generate commands on the output interface of the engine 4, depending on the XML description file. These commands may be composed of data read during the first step 500 or during the previous cycles (previous iterations of step 500 in other FSM states).

Some errors due to the formatting of the input stream may be further checked in step 504. Such errors may occur due to an unexpected end of a packet caused by a truncated packet or when a record is exceeded. A record designates a set of fields which length is given in the input stream. When a record is exceeded, either the record length, as provided in the input stream is wrong, or too many data have been read due to an error in the description file 5 which was used to generate the engine for example.

At step 505, the next state of the Finite State Machine 41 is selected and the process jumps to this state. Next state of the finite state machine 41 may be selected from:
  the data read in the first step 500 or in a previous cycle (previous iterations of step 500 in other FSM states);
  error check results obtained at step 504 (If errors are detected, the Finite State Machine jumps to error specific states where it waits for the end of the packet before processing the next packet normally); or
  a back-pressure signal representing a signal from the next core in the chain, in particular the order management core 12 that may request the engine to slow down so that the engine moves to a special rest state where it is inactive.

It should be noted that all steps 500 to 506 are executed in a single clock cycle, and that at each new clock cycle all these steps are repeated.

The man skilled in the art will readily understand that some steps of FIG. 5 can be performed according to another order. For example, it is possible to check errors (step 504) before generating command outputs (step 503).

Figure 6:
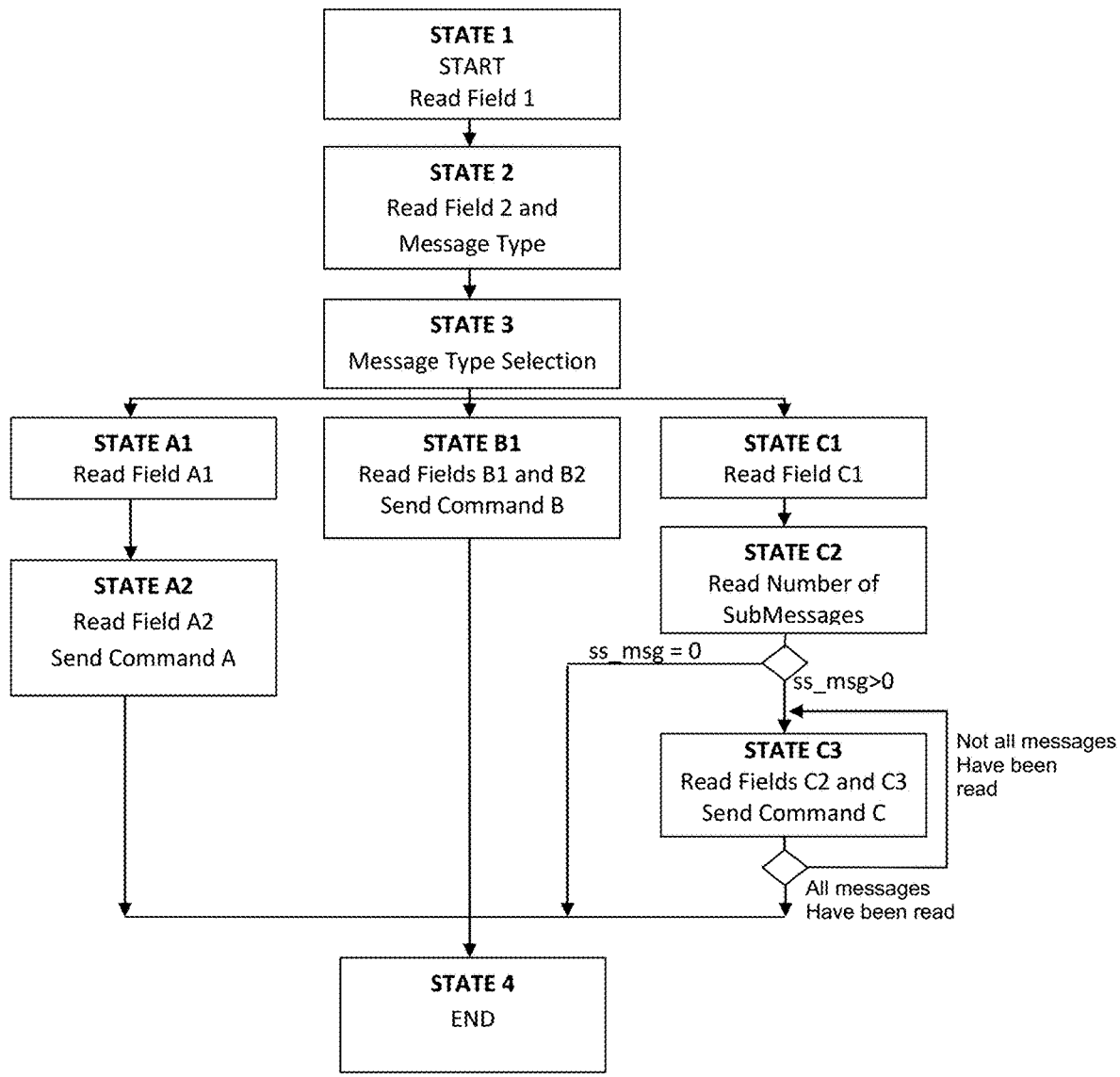
FIG. 6 shows an exemplary Finite State Machine, according to certain embodiments of the invention.

FIG. 6 is a flowchart illustrating the operation of a Finite State Machine, according to a simplified example of the invention. In the example of FIG. 6, the data streams received from the market are in binary format, and each packet received comprises a header followed by a unique message (among three possible messages A, B and C). The header and the different message that can be used have the following features:

A header comprising:
a first field of 4 bytes;
a second field of 2 bytes;
a message type of 1 byte.
a message A comprising:
a first field A1 of 4 bytes;
a second field A2 of 2 bytes.
A Message B comprising:
a first field B1 of 3 bytes;
a second field B2 of 1 byte.
A Message C comprising:
a first field C1 of 4 bytes; and
For a number of sub-messages (corresponding to 1 byte):
a second field C2 of 1 byte;
a third field C3 of 2 bytes.
Fields C2 et C3 are repeated as many times as the number of sub-messages.

In the example of FIG. 6, together with each message A and B, a command is sent at the end of messages A or B which comprises the information contained in the message as well as the header. A similar command is sent for message C. However, the command is sent with the sub-message in order to transmit all the information comprised in the sub-messages.

The Finite Machine State 41 is configured to store at least a part of the information obtained from the input stream by the decoding device 10 in the internal registers and send at least a part of this information in output commands.

The Finite State Machine 41 generated for a 4 byte input bus is illustrated in FIG. 6. As shown, in certain states (2, A2, C2, C3), the maximum number of bytes (4 bytes in the example) is not read:

In state A2, this occurs because the end of the packet is reached;

In state 2, this occurs because the decision made in state 3 is needed; It could be considered reading a fourth byte in state 4. In such case, it should be decided which internal register to use (A1, B1, C1, etc). If the fourth byte is not stored in any register, it cannot be used anymore.

In states C2 and C3, this is due to the presence of the loop and to the fact that the number of sub-messages can be equal to zero;

In states 3 and 4, no data is read.

As will be readily understood by the skilled person, FIG. 6 is only a simplified example to facilitate the understanding of certain embodiments of the invention. The invention is not limited to the exemplary structure of packets, messages, header, fields described in relation with FIG. 6. In particular, input data streams as provided by the market may comprise several message types, several messages per packets, headers with packet sizes and message sizes that are checked at the reception of the packet/message, etc. Further, although in the exemplary representation of FIG. 6, error and back-pressure handling states of the finite state machine 41 have not been represented, the skilled person will readily understand that such states can be included.

For market data input streams in FAST format, operators are applied to each field. Further, some fields of the FAST input stream may be "presence maps" fields on which depends the number of tokens read in certain states. In the example of FIG. 6, the number of tokens read in a given state is predefined: for example in state A2, two tokens are read (=2 bytes). In FAST, the number of read tokens may further depends on presence maps.

In addition, for market data input streams in FAST format, the operators may be applied in parallel to each of the different read field.

It should be noted that a specific encoding may be used for decimals in FAST: when the value to be transmitted in the stream is optional, a unique and null token may be used to indicate that the value is absent, a non-null token being then interpreted as the exponent of the decimal and the Finite State Machine 41 then reads a further token for the mantissa of the decimal (the value is considered as present). This is another example where the number of read tokens may depend on the value of other tokens.

The decoding device according to the invention is particularly adapted for implementation in reconfigurable platforms, such as FPGA.

Figure 7:
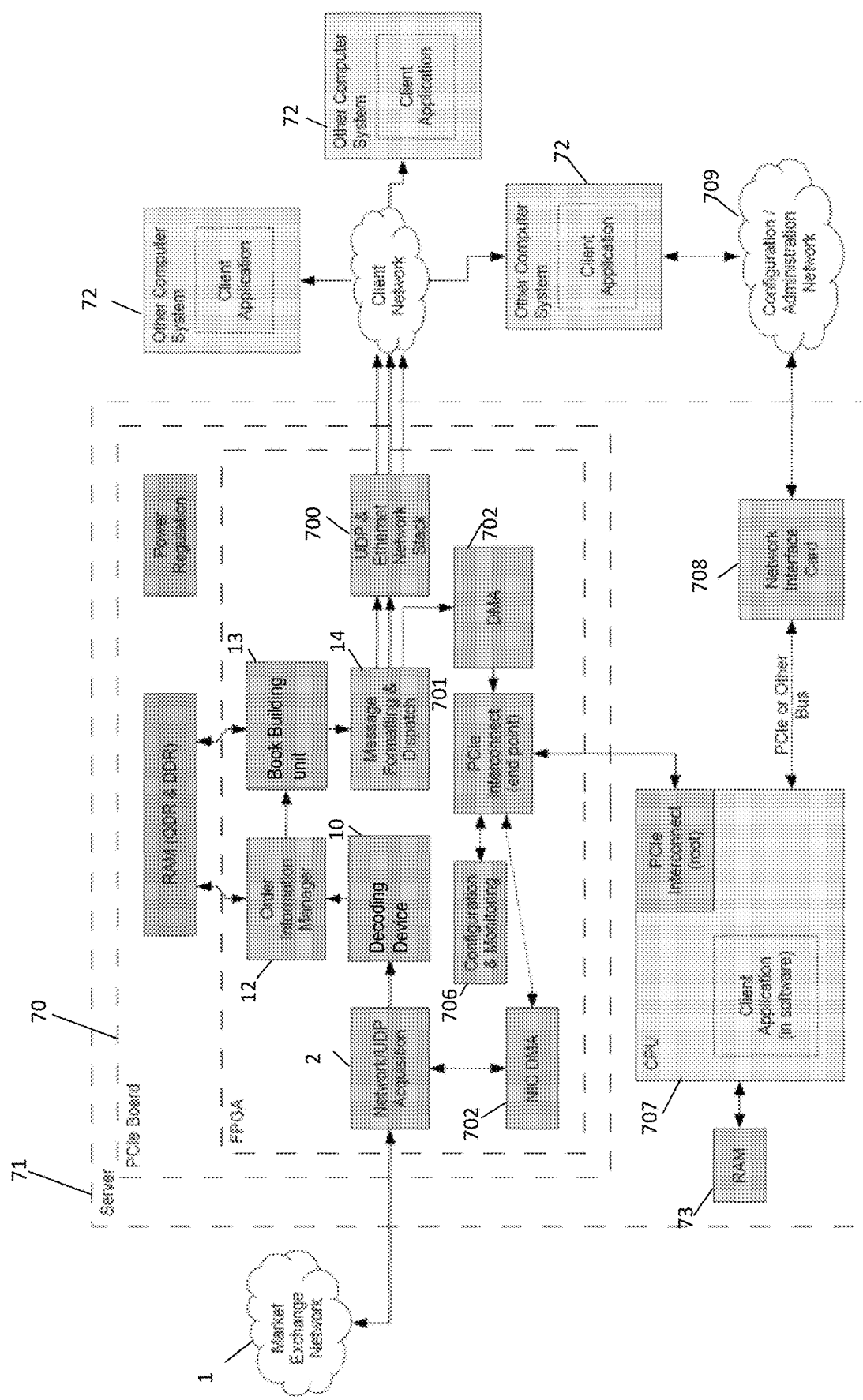
FIG. 7 is a block diagram illustrating an exemplary FPGA implementation in accordance with certain embodiments of the present invention.

FIG. 7 shows an exemplary implementation of the Market Data Processing system 100, in an FPGA on a PCIe Board 70 inside a standard server (host system) 71. The chain (Network/UDP Acquisition 2, Decoding Device 10, Limit Aggregation and Book Building Unit 13, Message Dispatch and transport Unit 14) represented in FIG. 1 may be complemented by:

a UDP & Ethernet Network Stack 700 configured to send output messages on a standard Ethernet network. For an optimal performance, this core may be connected to the client network by as many Ethernet connections as clients on said network. Client applications in other computer systems 72 on that same network may be implemented in software, accelerated in hardware or alternatively completely implemented in hardware. Alternatively, client applications can be connected directly to the system's output ports, to save the latency added by the network equipment(s).

A PCIe interconnect end point 701 configured to connect to the host system.

a DMA ("Direct Memory Access") 702 configured to send output messages to the host system's RAM 73 via the Board's PCIe connection; a Client application can thus be run on the host system's CPU 707, and consume the messages sent by the DMA.

A second "NIC" DMA 704 ("NIC" is the acronym for Network Interface Card) configured to receive and send Ethernet packets from/to the host system's software, through the Ethernet ports normally used by the Market Data Processing system's hardware. The PCIe board 70 can thus be seen as a normal Network Interface Card by the Operating System. This may be needed for various practical purposes (such as sending multicast group subscriptions, logging into the Market Exchange's systems, being able to check the connectivity). The important, latency-sensitive, data may be handled directly by the hardware, while the rest may be handled in software in certain embodiments. Such configuration also allows a direct connection to the exchange's network 1, without an extra hop through a network switch or router.

configuration & monitoring logic 706 for configuring the other cores, including for example subscribing to financial instrument updates, and monitoring the system's status and performance through the PCIe connection. Software may be provided to be executed on the host's CPU 707, for exploiting this configuration & monitoring logic, through a software API.

Along the FPGA, the PCIe Board 70 provides memory chips which may be used by the Market Data Processing system 100 as "external memory", and various support functions such as power regulation to power the components on the Board with the various voltages they need. It may also include physical connectors for the multiple Ethernet connections.

Several of such Boards can be plugged in PCIe slots of a Host System. This allows to scale the processing power, in order to, for example, support more market exchanges. Boards can communicate with each other via the host's PCIe interconnect.

The Host System 71 may be a standard computer server. The CPU 707 may be chosen to have a direct PCIe connection to the PCIe board(s) hosting the Market Data Processing system(s), for maximum performance of the Client Application run on it. The host system can also be equipped with a network interface 708 to connect to a Configuration and Administration Network 709. This allows to have a dedicated network for configuring and administration the server. The server can also be equipped with any standard component, such as a mass storage device (hard drive).

Physically separating the Market Exchange Network, the Client Network and the Configuration and Administration Network, has advantages in terms of security and performance.

Even if the invention is not limited to the use of PCIe to interface the FPGA to the Host System, the PCIe as particular advantages as it is currently the most widely used bus for high speed transfers between a server and add-on cards. The skilled person will however readily understand that the Market Data Processing system 100 could be interfaced via any other bus.

The invention also allows parallelized decoding of input streams provided in any data representation format based on the code generation approach (engine 4 built around the Finite State Machine 41, generated by the compiler 3 from description files 5 and instantiated by the decoding device 10).

This allows meeting the performance requirements of financial markets, while being easy to adapt to new input stream formats. For each market data feed to decode, the decoders according to the embodiments of the invention sustain 10 Gb/s data decoding with no back-pressure applied on the network.

The decoding device 10 is easy to use with a normalized output bus to the user logic that includes a market specific part depending on the feed's characteristics. Most of the common market data fields used for trading fit in the normalized part of the output bus, enabling user logic to support different market data feeds with no design changes.

According to the invention, the tokens can be processed in parallel while the overall process of the decoding device is sequential. By allowing the processing of several tokens in parallel, the invention improves the performances of the decoding device 10.

In a particular embodiment of the invention, the decoding device 10 could be implemented in the form of a plurality of decoders executed by respective FPGA logic, in particular two decoders, to process in parallel the input streams received by the market. In such embodiment, each decoder may comprise its own output formatting unit and respective tokenizers 40. Such embodiment may apply in specific situations, for example when the decoders are connected to different 10G ports and when they only process 10G each and/or when decoding several market data streams from different markets in different formats, simultaneously. Further, in such embodiment, an arbiter device may used between the decoders and the order management core so that the order management core does not receive the commands twice.

The invention claimed is:

1. A decoding device, implemented on an integrated circuit, for decoding a market data input stream received in a given data representation format, said decoding device comprising:
    an engine built around a finite state machine, the engine being generated from at least one description file and using at least one tokenizer configured to divide the input market data stream into a number of tokens and read a set of tokens in parallel during each clock cycle, the tokenizer comprising an output interface from which, during each clock cycle, the set of tokens read during said clock cycle are output;
    the engine further comprising a set of storage elements in which said sets of read tokens output by the tokenizer are accumulated;
    the engine being configured to generate output commands from the tokens accumulated in said storage elements depending on conditions related to the tokens accumulated in the storage elements derived from said description file; and
    the engine being configured to select the next state of the Finite State Machine based on a triggering condition derived from said description file, wherein the engine operates in a current state of the finite state machine.

2. The decoding device of claim 1, wherein the engine executes the division, accumulation, output command generation and next state selection operations in the same clock cycle if the condition related to the tokens accumulated in the storage elements is satisfied.

3. The decoding device of claim 1, wherein the engine is configured to keep accumulating tokens in the storage element during consecutive clock cycles until the satisfaction of the condition related to the tokens accumulated in the storage elements.

4. The decoding device of claim 1 wherein said condition relates to the number of tokens accumulated in the storage elements.

5. The decoding device of claim 1, wherein said at least one tokenizer is controlled by the finite state machine which controls the number of tokens read during each clock cycle.

6. The decoding device of claim 5, wherein said at least one tokenizer comprises a parser for dividing the input stream into tokens depending on the data representation format of the input stream, and a buffer for buffering the tokens provided by the parser.

7. The decoding device of claim 5, wherein said at least one tokenizer comprises a read management core to read a set of tokens obtained from said division of the input stream, and present the read tokens at its output interface.

8. The decoding device of claim 7, wherein the set of tokens that are to be read in certain states is determined based on conditions on the number of tokens that are to be read at each clock cycle.

9. The decoding device of claim 8, wherein said condition on the number of tokens that are to be read depends on the value of a specific token, the Finite State Machine being configured to:
    read the value of said specific token in the current clock cycle, and
    read a number of tokens among the available tokens depending on the read value of said specific token during the next clock cycles.

10. The decoding device of claim 7, wherein the tokens that have not been read from the read management core by the finite state machine are appended to new tokens and presented again on the output interface of said read management core during subsequent clock cycle(s).

11. The decoding device of claim 10, wherein the input stream has a binary format, and the read management core is configured to allow for random byte length reads in the input stream.

12. The decoding device of claim 1, wherein said triggering condition comprises at least one among the following conditions: a condition related to the result of error checks performed in the current state of said finite state machine to determine if the input data stream comprises formatting errors, a condition depending on the data stored in storage elements, and a condition depending on a back-pressure signal received from a next core in the processing thread.

13. The decoding device of claim 1, wherein the format of the input stream is either FIX-based, FAST-based or in a Binary format.

14. The decoding device of claim 1, further comprising a set of conversion units to further normalize the commands output by the engine.

15. A method for decoding an input market data stream said method being implemented on an integrated circuit, the method comprising, for each received market data stream, providing a finite state machine generated from at least one description file, said method further comprising the following steps:
  i) dividing the input market data stream with the integrated circuit into a number of tokens and providing a set of tokens that can be read in parallel during each clock cycle,
  ii) reading, in one current clock cycle, the provided tokens;
  iii) accumulating said sets of read tokens in storage elements,
  iv) generating output commands from the integrated circuit based on the tokens accumulated in said storage elements depending on conditions related to the tokens accumulated in the storage elements derived from said description file,
  v) selecting with the integrated circuit the next state of the Finite State Machine based on a triggering condition derived from said description file, and
  wherein steps ii to v are performed in a current state of the finite state machine.

* * * * *